US006161813A

United States Patent [19]

Baumgartner et al.

[11] Patent Number: 6,161,813

[45] Date of Patent: Dec. 19, 2000

[54] SOLENOID VALVE FOR AN ELECTRICALLY CONTROLLED VALVE

[75] Inventors: Peter Baumgartner, Linz; Eugen Drummer, Steyr; Johannes Renner, Nussdorf, all of Austria

[73] Assignee: Robert Bosch GmbH, Stuttgart, Germany

[21] Appl. No.: 09/171,843

[22] PCT Filed: Nov. 20, 1997

[86] PCT No.: PCT/DE97/02723

§ 371 Date: Oct. 28, 1998

§ 102(e) Date: Oct. 28, 1998

[87] PCT Pub. No.: WO98/38426

PCT Pub. Date: Sep. 3, 1998

[30] Foreign Application Priority Data

Feb. 28, 1997 [DE] Germany ........................... 197 08 104

[51] Int. Cl.[7] ............................ F02M 47/02; F16K 31/02

[52] U.S. Cl. ......................... 251/50; 251/48; 251/129.16; 251/129.18

[58] Field of Search .......................... 251/48, 50, 129.16, 251/129.18

[56] References Cited

U.S. PATENT DOCUMENTS

| | | | |
|---|---|---|---|
| 4,957,275 | 9/1990 | Homes | 251/50 X |
| 5,110,087 | 5/1992 | Studtmann et al. | 251/129.16 |
| 5,401,087 | 3/1995 | Goossens | 251/129.15 X |
| 5,460,350 | 10/1995 | Nagashima et al. | 251/129.15 |
| 5,601,275 | 2/1997 | Hironaka | 251/48 X |

FOREIGN PATENT DOCUMENTS 0753658 1/1997 European Pat. Off. .

*Primary Examiner*—Kevin Shaver
*Assistant Examiner*—John Bastianelli
*Attorney, Agent, or Firm*—Ronald E. Greigg; Edwin E. Greigg

[57] ABSTRACT

A solenoid valve comprising a magnet armature which is embodied as having multiple parts and has an armature disk and an armature bolt. The magnet armature is guided in a slider. A damping device is provided in order to prevent post-pulse oscillation of the armature after a closing of the solenoid valve. The required short switching times of the solenoid valve can be exactly maintained with a device of this kind. The solenoid valve is designated for use in injection systems with a common rail.

12 Claims, 5 Drawing Sheets

SOLENOID VALVE FOR AN ELECTRICALLY CONTROLLED VALVE

PRIOR ART

The invention relates a solenoid valve for an electrically controlled valve. A solenoid valve of this kind has been disclosed by EP 0 690 223 A2. It is used there to control an electrically controlled fuel injection valve. The valve needle of the fuel injection valve is loaded in the closing direction by a pressure prevailing in a control chamber. The solenoid valve operates in a known manner so that to initiate the injection, it initiates a discharge of the control chamber when the magnet of the solenoid valve is excited and consequently, the valve needle of the injection valve is lifted up from its seat through the action of the high pressure acting on it from the other side. In the solenoid valve, the armature is connected to the armature bolt against which the valve member of the solenoid valve in turn rests.

The disadvantage of the known solenoid valve is comprised in that when operating, an oscillation of the armature and/or rebounding of the valve member can occur, which is particularly disadvantageous if a rapid switching sequence of the solenoid valve is required and an injection should be executed that is divided into a pre-injection and a main injection, controlled by the solenoid valve.

Furthermore, the proposal has already been made to reduce the moving mass of the armature and valve member unit by virtue of the fact that the armature is guided so that it can move in relation to a part connected to the valve member. However, here too, there is a disadvantage in that the armature reverberates after the valve member is placed on its seat. Because of such an oscillation, the armature assumes an indefinite position after a pre-injection, which can result in the fact that in the subsequent main injection, varying opening times of the solenoid valve can occur with the same triggering, which causes a variation in the injection onset or the injection quantity.

ADVANTAGES OF THE INVENTION

The solenoid valve, has the advantage over the prior art that a rebounding of the valve member against its seat and an indefinite reverberation of the armature are prevented so that after a closing of the solenoid valve, the valve member maintains its closed position and after an intentional first deflection movement, the armature rapidly returns to its rest position before the main injection begins. It is also advantageous that a damping of a deflection motion of the armature produced in this way can be achieved without additional parts.

BRIEF DESCRIPTION OF THE DRAWINGS

Four exemplary embodiments of the invention are depicted in the drawings and will be explained in more detail in the description below.

DESCRIPTION OF THE EXEMPLARY EMBODIMENTS

Figure 1:
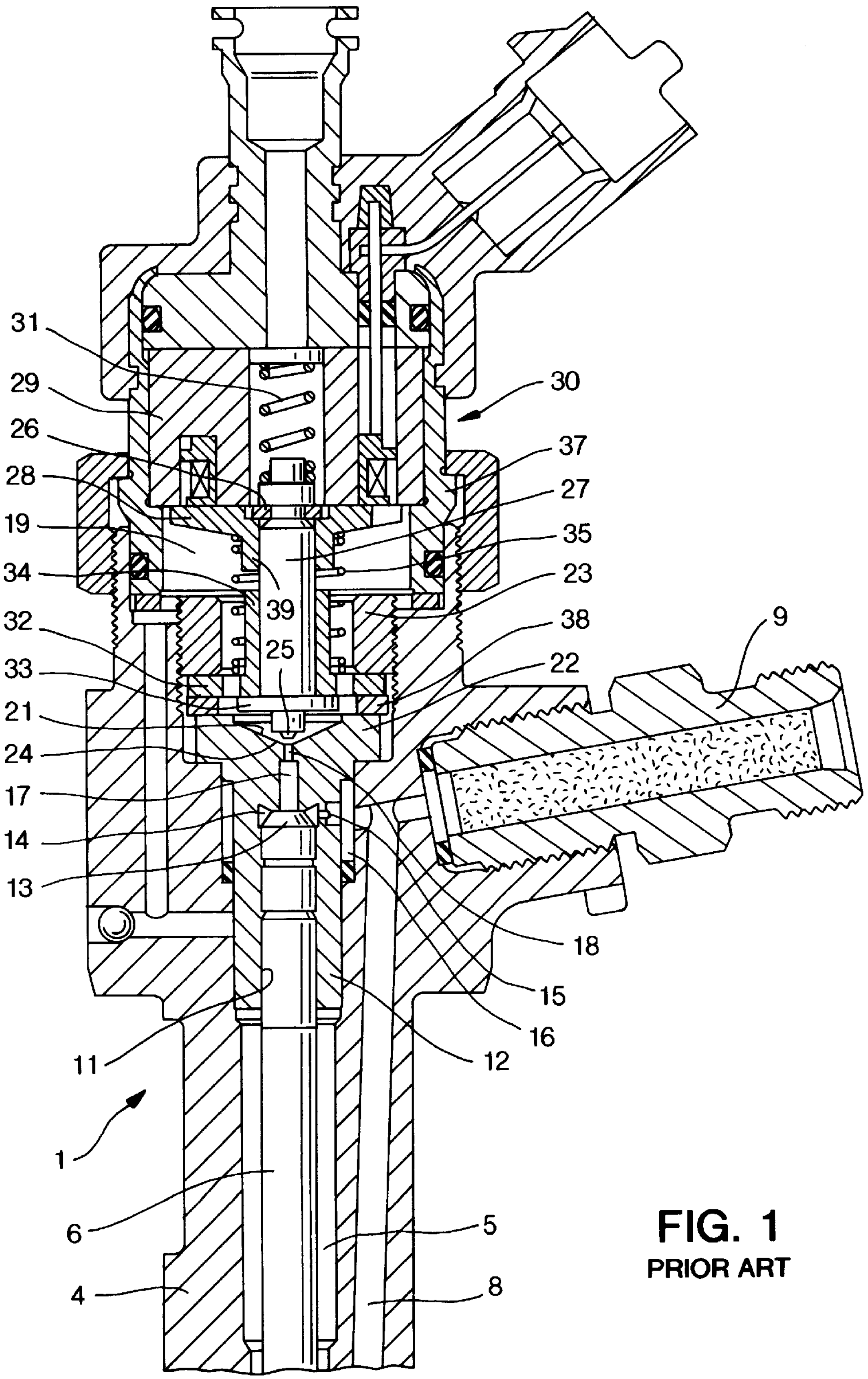
FIG. 1 PRIOR ART
FIG. 1 is a section through a part of an injection valve with the solenoid valve according to the invention in a sectional view, with an armature that can be moved on a bolt that is connected to the valve member of the solenoid valve.

FIG. 1 shows a partial section through an electrically controlled injection valve 1 as is known, for example, from the prior art mentioned at the beginning. An injection valve of this kind is designated for use in a fuel injection system that is equipped with a high-pressure fuel reservoir, which is continuously supplied with high-pressure fuel by means of a high-pressure fuel pump and from which this fuel can be supplied at injection pressure to the internal combustion engine by way of individual, electrically controlled injection valves. The injection valve 1, which is shown partially and in a sectional view, additionally has an injection valve housing 4 with a longitudinal bore 5 in which a valve piston 6 is contained, which on its one end, acts on a valve needle, not shown in detail, which in turn cooperates with injection openings of the fuel injection valve in a known manner, e.g. which is shown in the reference EP 0 690 223 mentioned at the beginning. The valve piston 6 is used to actuate the valve needle into the closed position, which on the other hand, is continuously subjected to a high fuel pressure acting in the opening direction, which is supplied from the high-pressure reservoir by way of a pressure bore 8 that extends in the longitudinal direction in the valve housing 4. The fuel quantity to be injected is also supplied to the injection openings by way of this bore and is injected into the combustion chamber of the accompanying engine. A connection fitting 9 on the valve housing 4 is provided for connecting the pressure bore 8 to the high-pressure reservoir.

On its end disposed opposite from the valve needle, not shown, the valve piston 6 is guided in a cylinder bore 11 that is let into a valve piece 12. In this cylinder bore, the end face 13 of the valve piston encloses a control pressure chamber 14, which continuously communicates, by way of a throttle bore 15 that leads radially through the wall of the valve piece, with an annular chamber 16 which circumferentially encompasses the valve piece and likewise continuously communicates with the connection fitting 9 and is subjected to the high fuel pressure prevailing in the high-pressure fuel reservoir.

Coaxial to the valve piston 6, a bore 17 extending in the valve piece 12 branches off from the control pressure chamber 14, which bore contains a discharge throttle 18 and feeds into a discharge chamber 19, which is connected to a fuel return of the injection valve in a manner not shown in detail here. The outlet of the bore 17 via throttle 18 from the valve piece occurs in the region of a conically countersunk part 21 of the outer end face of the valve piece 12. The valve piece 12 is additionally clamped to the valve housing 4 in a flange region 22 by way of a screw member 23.

In the region of the exit of the bore 17 in the conical part 21, a valve seat 24 is embodied which cooperates with a valve member 25 of a solenoid valve 30 that controls the injection valve. The valve member 25 is connected to an armature 28 by way of an intermediary piece in the form of an armature bolt 27, which cooperates with an electromagnet 29 of the solenoid valve 30 and is movably coupled to the armature bolt. The armature has the form of an armature plate 28 provided with a guide connector 39 and is supported in a dynamically movable manner on the armature bolt 27 through the action of its inertial mass counter to the initial force of a restoring spring 35 and in the rest position, is pressed by means of this restoring spring 35 against a stop ring 26 on the bolt 27. The restoring spring 35 is supported in a stationary manner in the housing by way of a flange 32 of a slider 34 guiding the armature bolt, and this slider is clamped, together with this flange, between the valve piece 12 and the screw part 23 in the solenoid valve housing 37 that contains the electromagnet 29. The armature bolt 27 and with it, the armature plate 28 and the valve member 25 moved by means of the armature bolt are continuously acted upon in the closing direction by means of a closing spring 31 supported in a stationary manner in the housing, so that the valve member 25 normally rests in the closed position against the valve seat 24. Upon excitation of the electromagnet, the armature plate 28 is attracted by the electromagnet and as a result, the bore 17 or 18 is opened in relation to the discharge chamber 19.

Between the valve member 25 and the armature plate 28, an annular shoulder 33 is disposed on the armature bolt 27 as a stop part and upon excitation of the electromagnet, this annular shoulder strikes against the flange 32 of the slider 34 and thus limits the opening stroke of the valve member 25. In order to adjust the opening stroke, an adjusting disk 38 is inserted between the flange 32 and the valve part 12.

The opening and closing of the valve needle is controlled in the following manner by the solenoid valve. In the closed position of the solenoid valve member 25, the control pressure chamber 14 is closed in relation to the discharge side 19 so that in it, the high pressure, which also prevails in the high-pressure fuel reservoir, builds up very rapidly by way of the supply via the throttle 15. By way of the surface area of the end face 13, the pressure in the control pressure chamber 14 exerts a closing force on the valve needle that is greater than the forces acting on the other end in the opening direction as a result of the prevailing high pressure. If the control pressure chamber 14 opens toward the discharge side 19 through the opening of the solenoid valve, the pressure in the small volume of the control pressure chamber 14 drops very rapidly since this chamber is uncoupled from the high-pressure side by way of the throttle bore 15. As a result of this, the force acting on the valve needle in the opening direction and coming from the high fuel pressure prevailing on the valve needle predominates so that the valve needle moves upward and the injection openings are thus opened for the injection. However, if the solenoid valve 30 closes the bore 17 or 18 again, the pressure in the control pressure chamber 14 can nevertheless be built up again very rapidly by means of the replenishing fuel flowing by way of the throttle bore 15 so that the original closing force immediately prevails and the valve needle of the fuel injection valve closes. These control events are also sufficient to produce very short injection times as is required in a known manner for a pre-injection carried out before a main injection.

Nevertheless, high demands for switching precision must be placed on the solenoid valve. In particular, a rebounding of the valve member and oscillating influences become disadvantageously apparent as mentioned at the beginning. A rebounding occurs when a relatively large mass is accelerated and then is suddenly braked abruptly, when the armature bolt, together with the armature plate, and the valve member strike as a mass against the valve seat. However, because a significant part of the mass moved by the armature, the armature plate, is now movably supported on the other moving part, the armature bolt, after the valve member 25 comes to rest on the valve seat 24, the armature plate 28 can move further counter to the force of the restoring spring 35 so that all at once, the effectively braked mass becomes smaller and the elastic deformation of the valve seat as an energy reserve, which leads to the disadvantageous rebounding of the valve member, is now more slight. The lagging armature plate, moreover, generates a dynamic force on the valve member that increases with the compression of the restoring spring 35 and this force also holds the valve member in a stable fashion against its seat and counteracts the rebounding. With the compression of the restoring spring 35, it is uncoupled from the closing spring so that the full initial force of the closing spring acts on the valve member. As a result, however, the lagging can disadvantageously produce a considerable oscillation of the armature plate 28 in relation to restoring spring 35 so that the position of the armature plate is indefinite in an actuation of the valve member required immediately after this and a switching of the solenoid valve does not occur rapidly enough and with a reproducibly uniform switching time.

Figure 2:
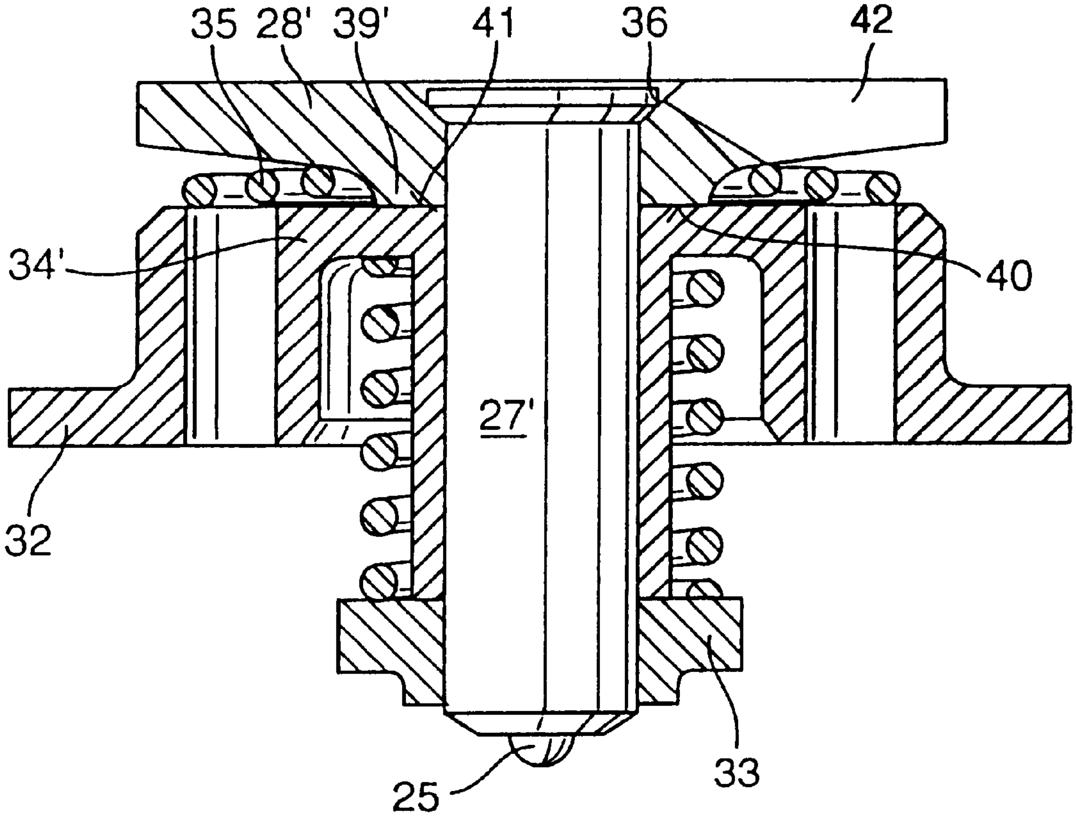
FIG. 2 shows a first embodiment of the invention with a limitation of the armature movement.

In a modification of the embodiment according to FIG. 1, therefore, the armature according to FIG. 2 has been limited in its mobility. FIG. 2 shows only the part of the armature bolt 27' that is visible in FIG. 1, with the armature plate 28' and the slider 34'. As in the exemplary embodiment according to FIG. 1, the armature plate is connected in a plane-parallel fashion to the pole 61 of the electromagnet 29 (see FIG. 3) and transitions into a considerably shortened guide connector 39', which slides on the armature bolt 27'. The sliding path of the armature plate is in turn defined on the one end by means of a stop, now in the form of an end head 36 on the armature bolt 27', and is defined on the other end by means of the contact of the guide connector 39' with its end face 40 against the end face 41 of the slider 34'. The compression spring 35 normally holds the armature plate 28' in contact with the head 36, as shown in FIG. 2. With increasing convergence during a dynamically produced movement of the armature plate against the armature bolt, the end faces 40 and 41 form a squeeze gap between themselves which generates an opposing force in the fuel-filled chamber in the housing of the solenoid valve and this opposing force counteracts the movement of the armature plate. This opposing force is more effective the lower the kinetic energy of the armature plate in its approach toward the slider 34'. The movement behavior of the armature plate in given time periods can be optimized by matching the magnitude of the free path of the armature plate, the magnitude of the restoring force of a possibly provided restoring spring, and the size of the surfaces approaching each other. The given time period lies, for example, between a pre-injection and a main injection, before which the armature plate should have reached a reproducible, assured position.

If the armature bolt has brought the valve member 25 into its closed position, then it is subsequently raised by the compression occurring with the lag motion of the armature plate and at the same time as this, the lagging of the armature plate 28' is braked in cooperation with the restoring spring on the one hand, and on the other, the damping action of the end faces 40 and 41 approaching each other so that they are rapidly returned to their reproducibly constant initial position on the stop 36. The restoring spring 35 is embodied here as a conical spring, which permits the achievement of a small space with a fully effective spring path. Overflow openings 42 are provided in the armature plate 28' for the fuel displaced in the operation of the solenoid valve.

Figure 6:
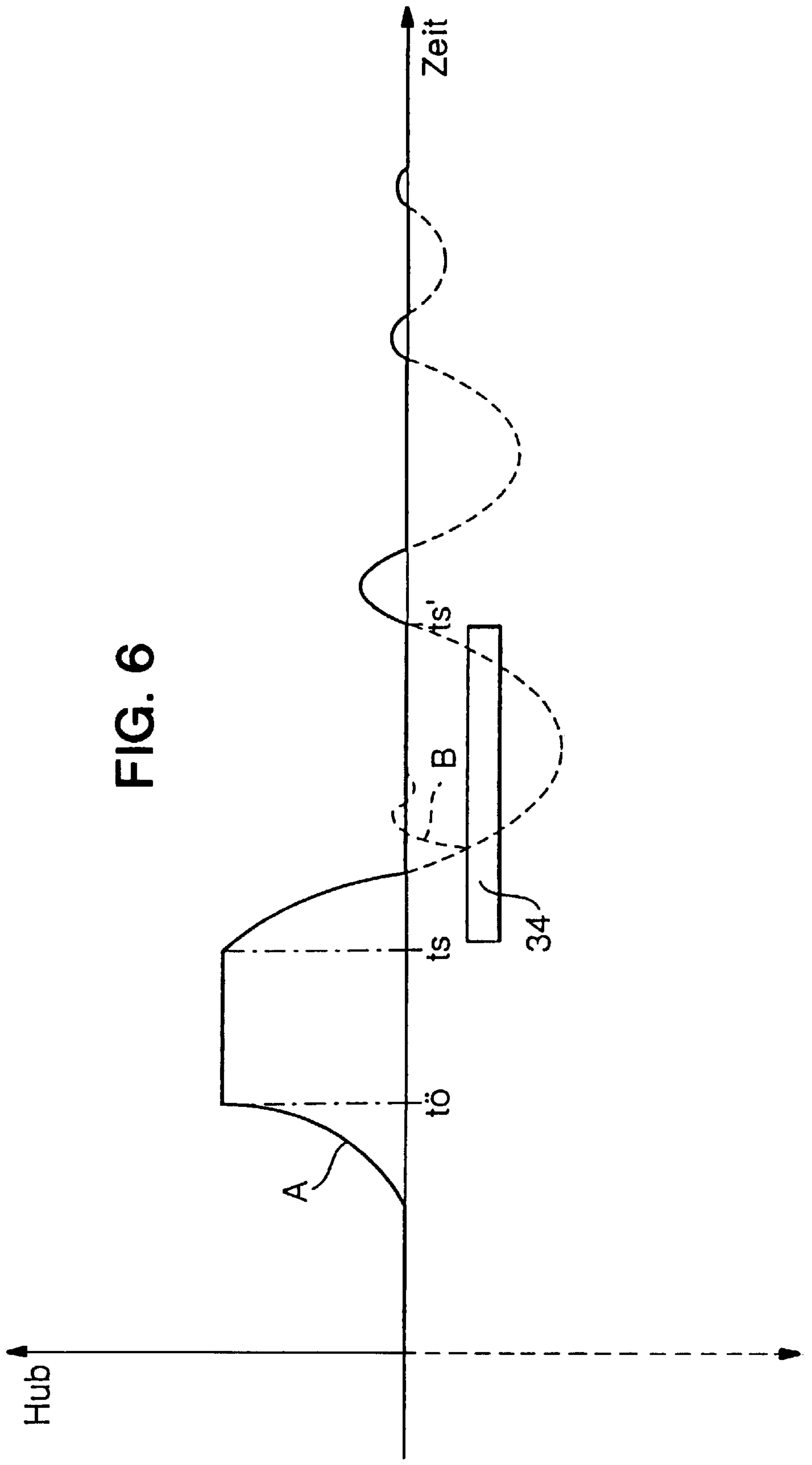
FIG. 6 shows a diagram over the stroke course of the armature in a closing procedure of the solenoid valve.

The effectiveness of the device according to the invention can be inferred from FIG. 6. In it, time is plotted over the abscissa and the movement of the armature with the armature bolt and armature plate is plotted on the ordinate. A rise in the curve A is visible, which, at time $t\ddot{o}$, reaches a plateau in which as a result of the attraction force of the electromagnet 29, the armature has executed its maximum stroke and the connection 18 to the control pressure chamber 14 has completely opened. At time ts, for the purpose of closing the solenoid valve, the excitation of the electromagnet is disconnected. In so doing, when the valve member comes to rest on its seat 24, an overswinging of the armature plate 28 occurs, which is represented by the dashed curve. The armature bolt 27 with the valve member 25 at first remains in the position of the solid line. Due to the overswinging, it is apparent that at time ts', the returning armature plate produces a reopening of the valve by virtue of the fact that the armature bolt is lifted up again for a short time. This occurs two more times in succession in the example depicted. However, if the deflection movement of the armature plate is limited by the position of the slider 34 according to FIG. 2, which is represented as a black bar in the Fig., then a movement reversal of the armature plate occurs there after a prior damping and a short dying away of this movement according to the curve B. A damping shortly before the armature plate comes to rest on the stationary part, in this instance, the slider 34' according to FIG. 2, the inverting impulse decreases after the armature plate strikes against the slider 34'.

Figure 3:
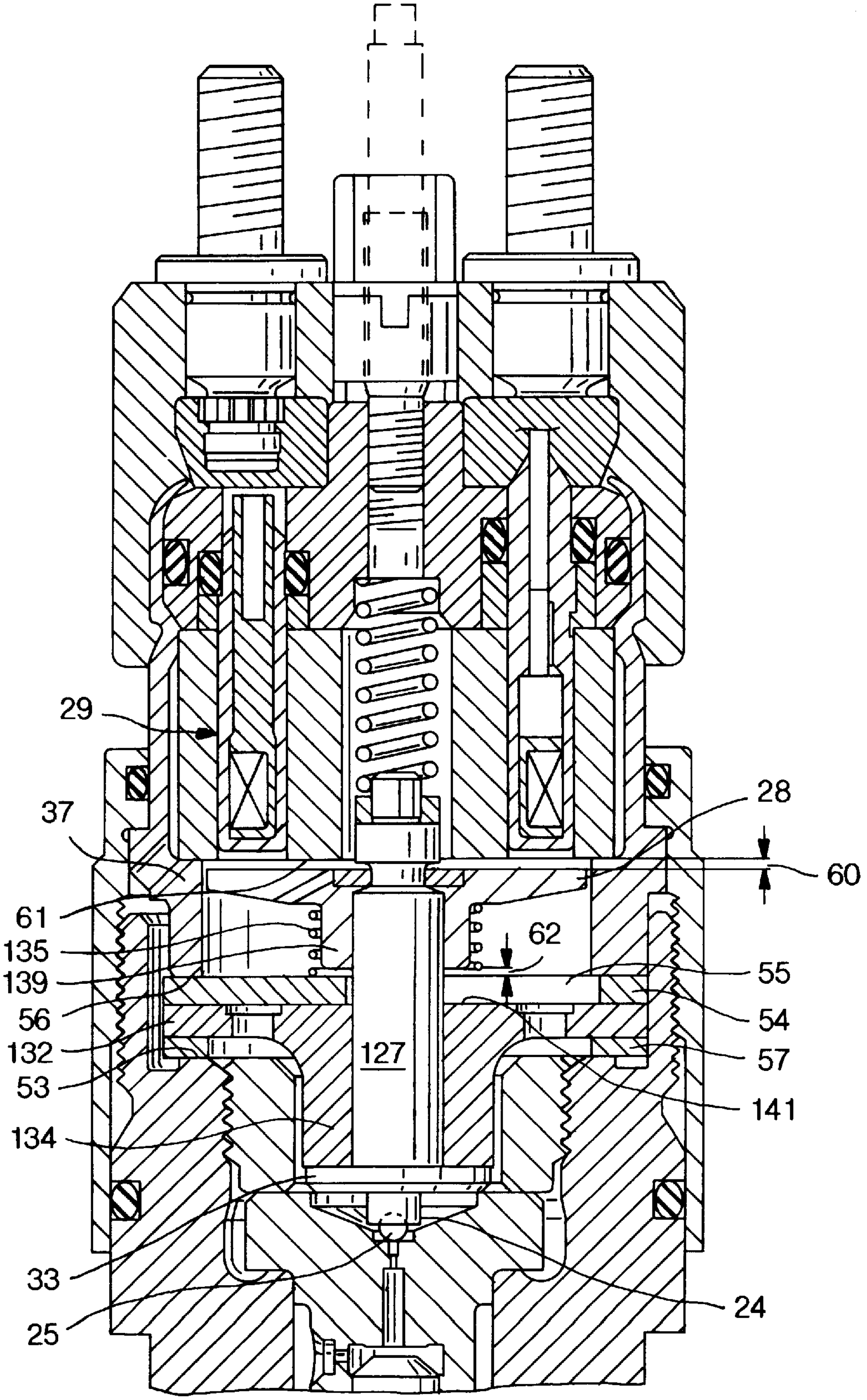
FIG. 3 shows a second embodiment with a disk for adjusting the limitation of the armature movement.

In a modification of the embodiment according to FIG. 2, in FIG. 3, the guide connector 139 is embodied as longer and a restoring spring 135 can therefore be used, which has more spring coils and as a result, can be better embodied with regard to its spring behavior, e.g. progressiveness. In addition, due to the longer connector 139, the guidance of the armature is improved.

In contrast to FIG. 1, the slider 134 is embodied so that it overlaps a shoulder 53 of the injection valve housing. A first adjusting disk 54, which has a recess 55 for the passage of the armature bolt 127, is placed on the end face 141 and a second adjusting disk 57 is also provided between the shoulder 53 and the flange 132. The first adjusting disk is pressed against the flange 132 by means of an end face 56 of the solenoid valve housing 37 and by way of this flange and the second adjusting disk, is pressed against the shoulder 53 of the injection valve housing so that the adjusting disks and the slider are fixed together in a stationary manner. The distance of the slider 134 from the valve seat 24 can be adjusted with the aid of the thickness of the second adjusting disk so that the maximal opening stroke of the valve member 25 of the solenoid valve can be adjusted by means of fixing the annular shoulder 33 that comes into contact with the end face of the slider 134. At the same time, a residual air gap 60 between the end face of the armature disk 28 and the pole 61 of the electromagnet is also influenced, which must be laid out so that a magnetic adhesion is prevented after the de-energizing of the electromagnet. In contrast to this, the thickness of the first adjusting disk 54 is used to adjust the path 62 that the armature plate can travel counter to the force of the restoring spring after the valve member 25 comes to rest against the valve seat 24 in the closing process of the solenoid valve. Since this disk also changes the distance of the pole 61 of the electromagnet from the flange of the slider 134 and therefore changes the distance of the armature plate 28 from the pole 61, the residual air gap 60 is simultaneously also influenced with this adjusting disk.

In lieu of this first adjusting disk 54, two disks are also advantageously provided at this location, an outer disk that determines the residual air gap and an inner disk that determines the path of the armature plate and can be inserted there loosely. In addition, however, this inner disk can also be held in contact with the slider 134 by the restoring spring 135 in order to prevent an uncontrolled wandering of the disk. To that end, the inner disk can also be provided with an offset annular shoulder on which the restoring spring rests. The path 62, the residual air gap 60, and the maximal valve stroke can therefore be adjusted with the selection of the thickness of the first adjusting disk 54 or of the above-mentioned outer disk and the inner disk as well as with the second adjusting disk 57.

Figure 4:
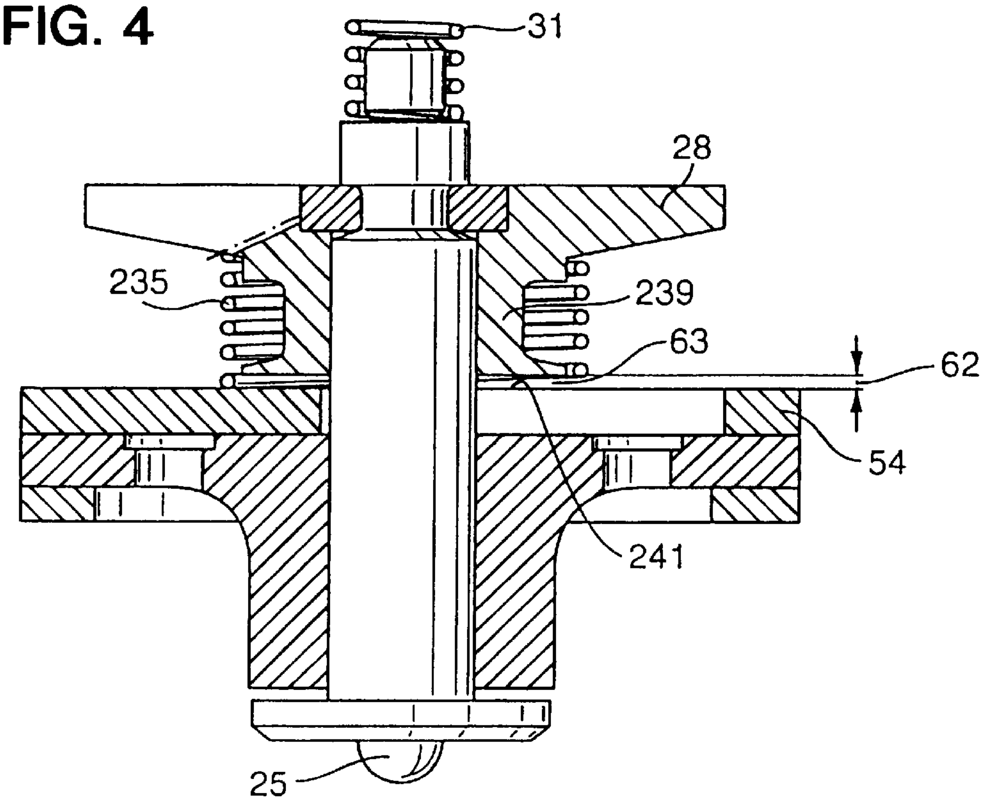
FIG. 4 shows a third variant of the invention, with an enlarged strike face of the armature.

While the two above-mentioned exemplary embodiments have a guide connector 39' or 139, which ends in a relatively small end face 40 of the armature, now, according to the exemplary embodiment according to FIG. 4, this face 241 is significantly enlarged by virtue of the fact that the guide connector 239 has a plate-like enlargement 63 toward the side of the first adjusting disk 54. By means of this larger face, with the approach of the armature toward the adjusting disk 54, a squeezing flow is produced, with significantly more action than in the previous example so that the striking of the armature against the adjusting disk is damped even more strongly at the end of its possible path and correspondingly, the rebounding impulse, which would be the cause of further oscillation, is significantly reduced. Also in this exemplary embodiment, the restoring spring 235 is embodied as a cylindrical spring, analogous to the exemplary embodiment according to FIG. 3.

Figure 5:
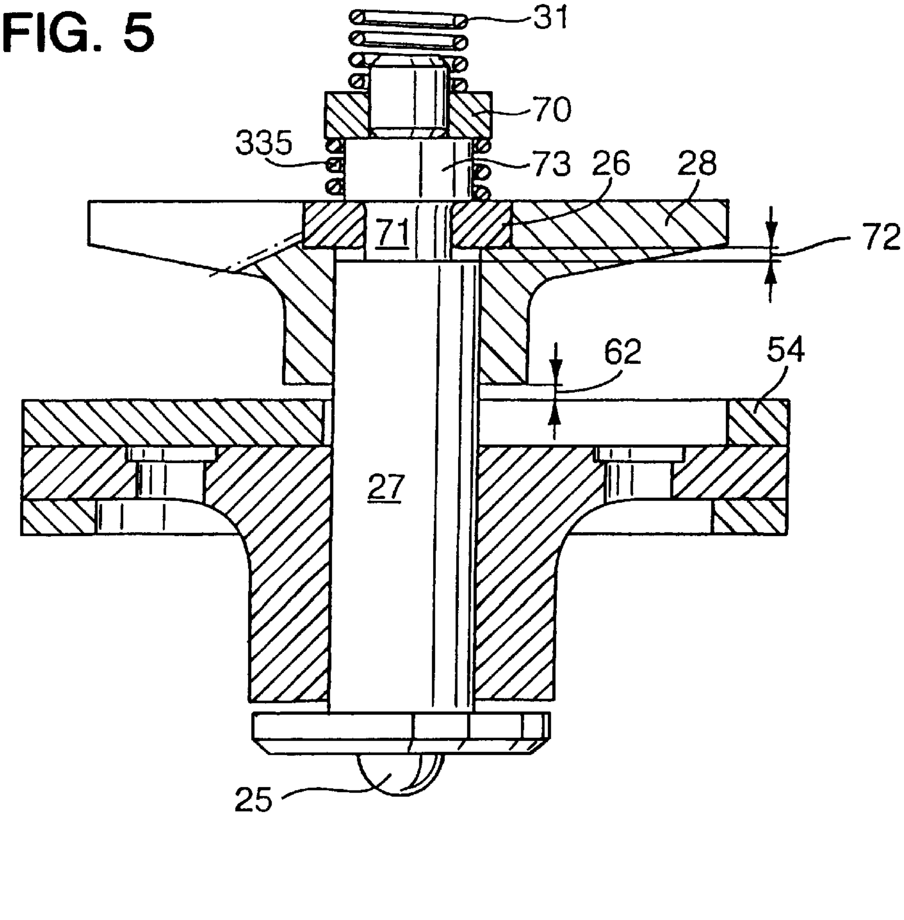
FIG. 5 shows a fourth embodiment of the device, with an alternative embodiment of a restoring spring for the armature.

In a modification to the exemplary embodiment according to FIG. 4, in FIG. 5, the restoring spring 335 is now no longer disposed between the armature and the first adjusting disk 54, but is disposed between the stop ring 26 and a spring plate 70 against which the closing spring 31 rests. The stop ring 26 is embodied as a ring inserted into an annular groove 71, wherein a play 72 is provided between the stop ring and the axial limitation of the annular groove 71. This play is on the order of magnitude of the path 62 between the armature 28 and the adjusting disk 54. The restoring spring 335 extends the length of a collar 73, which adjoins the annular groove 71 toward the side of the closing spring and constitutes the support of the spring plate 70.

In this exemplary embodiment, as in the preceding exemplary embodiment, the armature executes a stroke over the length of the path 62 and can then travel back to the stop 26, as is shown in the momentary position in FIG. 5. Then, through the action of the restoring spring 335, the armature 28, together with the stop ring 26, is guided back into the rest position of the armature bolt 27 shown in relation to the first adjusting plate 54 and assumes a definite position there, which assures that time for the opening stroke is geometrically determined, e.g. when there is a main injection that occurs after a short pre-injection. The play 72 permits the shifting motion of the armature over its path 62.

The spring 335 can also be completely eliminated if it is assumed that by means of the own weight of the armature, it always reaches the bottom position on the first adjusting disk. Furthermore, a residual magnetic force between the armature and the adjusting disk 54 encourages the fixing of the armature in contact with the adjusting disk.

The foregoing relates to a preferred exemplary embodiment of the invention, it being understood that other variants and embodiments thereof are possible within the spirit and scope of the invention, the latter being defined by the appended claims.

What is claimed is:

1. A solenoid valve (30) for controlling an injection valve of a fuel injection device, comprising an electromagnet (29) with a magnetic pole (61), a valve needle whose opening and closing are controlled by said electromagnet, an armature (28), and a valve closing member (25) that is moved with the armature and said valve closing member is acted on in a closing direction by a valve closing spring (31), said valve closing member cooperates with a valve seat (24), wherein the armature is moved in relation to an intermediary part embodied as an armature bolt (27), said intermediary part is connected to the valve closing member, a slider (34) fixedly disposed in the solenoid valve, said armature bolt (27) is guided to slide in said slider on movement of said armature bolt to a closed position of said valve closing member (25) though an action of its inertial mass away from a pole-end stop on the armature bolt (27), a damping device is provided, which cooperates with the armature and a stationary part, with which a post-pulse oscillation of the armature (28) is damped in a dynamic motion, the stationary part of the dampening device is an end face of the slider or a part supported in front of the slider and embodied as a disk, and the armature contacts with an end face when the armature is dynamically moved, and the armature is embodied as an armature plate that cooperates with the magnetic pole (61), with a first end face oriented toward the magnetic pole (61) of the electromagnet and a second end face oriented toward the stationary part, which, together with the stationary part, constitutes the dampening device.

2. The solenoid valve according to claim 1, in which the armature has a shaft which connects the armature plate to a stop part, whose end face, as the second end face of the armature, constitutes a flat surface, and when this flat surface and the smooth, stationary part converge, a hydraulically effective, damping squeeze gap is formed between them.

3. The solenoid valve according to claim 2, in which the stop part widens like a flange, starting from the diameter of the shaft.

4. The solenoid valve according to claim 1, in which the valve seat of the solenoid valve is disposed in a stationary fashion in an injection valve housing, that the electromagnet of the solenoid valve is disposed in a housing that is clamped firmly in the injection valve housing, wherein the slider has a stop against which a stop part of the bolt on the valve member end comes to rest with a maximal opening stroke of the valve member, and an adjusting disk is disposed in front of the slider, and by means of a thickness of this disk, a residual air gap can be adjusted, which occurs between the armature and the magnetic pole (61) of the electromagnet if the valve member of the solenoid valve is disposed in the open position when the electromagnet is excited.

5. The solenoid valve according to claim 2, in which the valve seat of the solenoid valve is disposed in a stationary fashion in an injection valve housing, that the electromagnet of the solenoid valve is disposed in a housing that is clamped firmly in the injection valve housing, wherein the slider has a stop against which a stop part of the bolt on the valve member end comes to rest with a maximal opening stroke of the valve member, and an adjusting disk is disposed in front of the slider, and by means of a thickness of this disk, a residual air gap can be adjusted, which occurs between the armature and the magnetic pole (61) of the electromagnet if the valve member of the solenoid valve is disposed in the open position when the electromagnet is excited.

6. The solenoid valve according to claim 3, in which the valve seat of the solenoid valve is disposed in a stationary fashion in an injection valve housing, that the electromagnet of the solenoid valve is disposed in a housing that is clamped firmly in the injection valve housing, wherein the slider has a stop against which a stop part of the bolt on the valve member end comes to rest with a maximal opening stroke of the valve member, and an adjusting disk is disposed in front of the slider, and by means of a thickness of this disk, a residual air gap can be adjusted, which occurs between the armature and the magnetic pole (61) of the electromagnet if the valve member of the solenoid valve is disposed in the open position when the electromagnet is excited.

7. The solenoid valve according to claim 4, in which the adjusting simultaneously constitutes the stationary part of the damping device.

8. The solenoid valve according to claim 7, in which apart from the adjusting disk, an additional disk is clamped together with the solenoid valve housing and the injection valve housing and used as the stationary part to adjust a maximal movement path of the armature in the closing direction of the valve on the bolt.

9. The solenoid valve according to claim 8, in which the adjusting disk and/or the additional disk disposed between a flange of the slider and the housing of the solenoid valve are clamped in a stationary manner to the injection valve housing by said flange, and that a second adjustment disk is clamped between the injection valve housing and the flange of the slider in order to adjust the position of the slider and therefore to adjust the maximal stroke of the valve member.

10. The solenoid valve according to claim 4, in which the adjusting disk and/or an additional disk disposed between a flange of the slider and the housing of the solenoid valve are clamped in a stationary manner to the injection valve housing by said flange, and that a second adjustment disk is clamped between the injection valve housing and the flange of the slider in order to adjust the position of the slider and therefore to adjust the maximal stroke of the valve member.

11. The solenoid valve according to claim 7, in which the adjusting disk and/or an additional disk disposed between a flange of the slider and the housing of the solenoid valve are clamped in a stationary manner to the injection valve housing by said flange, and that a second adjustment disk is clamped between the injection valve housing and the flange of the slider in order to adjust the position of the slider and therefore to adjust the maximal stroke of the valve member.

12. The solenoid valve according to claim 8, in which the adjusting disk and/or the additional disk disposed between a flange of the slider and the housing of the solenoid valve are clamped in a stationary manner to the injection valve housing by said flange, and that a second adjustment disk is clamped between the injection valve housing and the flange of the slider in order to adjust the position of the slider and therefore to adjust the maximal stroke of the valve member.

* * * * *